United States Patent

Clark et al.

[15] 3,696,137
[45] Oct. 3, 1972

[54] POLYPHENYLENE-OXIDE-ORGANOPOLYSILOXANE BLOCK CO-POLYMERS

[72] Inventors: Robert F. Clark, Glendale Heights, Ill.; Karl W. Krantz, Schenectady, N.Y.

[73] Assignee: General Electric Company

[22] Filed: March 5, 1971

[21] Appl. No.: 121,535

[52] U.S. Cl. ............. 260/448.8 R, 252/63, 252/66, 252/351, 260/46.5 R
[51] Int. Cl. ............................................. C07f 7/18
[58] Field of Search ............................. 260/448.8 R

[56] References Cited

UNITED STATES PATENTS

| | | |
|---|---|---|
| 2,386,793 | 10/1945 | Hanford..........260/448.8 R X |
| 2,909,551 | 10/1959 | Shibe..................260/448.8 R |
| 3,125,635 | 3/1964 | Murray et al....260/448.8 R X |
| 3,270,133 | 8/1966 | Holub..............260/448.8 R X |
| 3,354,194 | 11/1967 | Kaufman.............260/448.8 R |

*Primary Examiner*—Tobias E. Levow
*Assistant Examiner*—P. F. Shaver
*Attorney*—Donald J. Voss, Donavon L. Favre, Frank L. Neuhauser, Oscar B. Waddell and Joseph B. Forman

[57] ABSTRACT

Block copolymers having polyphenylene oxide segments and polydimethylsiloxane segments, with the units present in critical length ratios, are useful as surface tension depressants for dielectric fluids, particularly dielectric fluids of the askarel type.

3 Claims, No Drawings

POLYPHENYLENE-OXIDE-ORGANOPOLYSILOXANE BLOCK COPOLYMERS

BACKGROUND OF THE INVENTION

Block copolymers of polycarbonates and polysiloxanes are known to lower the surface tension of dielectric fluids, particularly chlorinated biphenyl capacitor fluids, such as Pyranol. Reduction of the surface tension of these dielectric fluids, so long as the surface tension depressant remains compatible, is of value in capacitor design. A prime function of such fluids is to displace all gas bubbles and fill all voids between the electrically conducting elements and the dielectric spacer(s), and also within the latter if initially of porous structure. A low surface tension enables the fluid to penetrate, purge all gas bubbles and wet all surfaces with maximum efficiency.

While, based upon chemical factors, it would appear that block copolymers of polyphenylene oxide and polydimethylsiloxanes would be soluble in Pyranol dielectrics, so as to provide similar benefits, this is not the case.

SUMMARY OF THE INVENTION

In accordance with the present invention it was unexpectedly discovered that, while block copolymers of polyphenylene oxide and polydimethylsiloxanes would, indeed, reduce the surface tension of dielectric fluids, such as Pyranol, the polyphenylene oxide-polydimethylsiloxane block copolymers are soluble in the dielectric fluids only when the length of the polyphenylene oxide segment and the length of the polydimethylsiloxane segment are closely controlled. In particular, if the lengths of the polyphenylene oxide segments separating the polydimethylsiloxane segments are too long or too short, or the length of the polydimethylsiloxane segments separating the polyphenylene oxide are too long or too short, the material is not soluble in the dielectric fluid.

Use of polyphenylene oxide-organopolysiloxane block copolymers as surface tension depressants for dielectric fluids is particularly valuable because of the superior thermal stability of such materials and their relatively low cost, particularly relative to a polycarbonate-polyorganosiloxane block copolymer.

In accordance with the present invention it has unexpectedly been discovered that useful surface tension depressants for dielectric fluids are provided by block copolymers of polyphenylene oxide and polydimethylsiloxane having the formula:

I

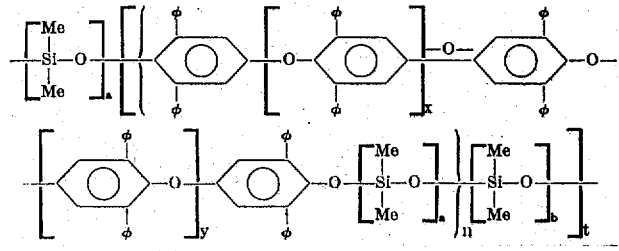

where Me is methyl $\phi$ is phenyl, $a$ is from 4 to 7, $b$ is from 0 to 500, the sum of $x$ and $y$ is from 2 to 17, $n$ is from 2 to 10, and $t$ is 1 or more.

DESCRIPTION OF THE PREFERRED EMBODIMENTS

As indicated in formula I, the polyphenylene oxide-polydimethylsiloxane block copolymer surface tension depressant has critical lengths for the polydimethylsiloxane segment separating the polyphenylene oxide segments, and for the length of the polyphenylene oxide segment separating the polydimethylsiloxane segments. In particular, there must be from four to seven dimethylsiloxane groups between each polyphenylene oxide segment in a recurring chain, and between five and 20 diphenylphenoxide groups between each polydimethylsiloxane segment.

As noted in the formula, additional polydimethylsiloxane blocks are permissible within the chain, but only so long as a series of blocks with the critical lengths also exist. Thus, additional polydimethylsiloxane segments may be present, with $b$ having a value of from 0 to 500, preferably from 0 to 200.

There must be recurring polyphenylene oxide and polydimethylsiloxane segments of the critical size range within the block copolymer, in addition to any further polydimethylsiloxane units which are present. Thus, $n$ is from 2 to 10, preferably from 2 to 4. The intrinsic viscosity of the material is not critical and, thus, $t$ is 1 or more.

The $(BA)_x$ block copolymers employed in the present invention are formed by the method described in copending application Ser. No. 121,518, filed of even date herewith and assigned to the same assignee as the present invention. In the formula B is a polyphenylene oxide segment and A is a polydimethylsiloxane segment. The polyphenylene oxide segments are incorporated into the block copolymer employing, as a reactant, the difunctionally terminated polyphenylene oxide oligomers described and claimed in the copending application of Karl W. Krantz, Ser. No. 121,517, filed of even date herewith and assigned to the same assignee as the present invention.

As described in the first-mentioned copending application, the block copolymers are formed by the reaction of the difunctionally terminated polyphenylene oxide oligomers with polydiorganosiloxanes having amine chain terminals. The additional polydimethylsiloxane units, if such are desired, may be incorporated into the block copolymer employed according to the present invention by the "back coupling" reaction, also described and claimed in the first-mentioned copending application.

EXAMPLE 1

In accordance with the present invention, a block copolymer of polyphenylene oxide and polydimethyl- lar block copolymers to be employed according to the present invention, a block copolymer of the structure ABA having the formula:

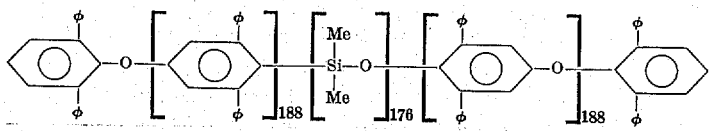

siloxane was prepared having the structure of formula I where $a$ was 7, $b$ was 92, the sum of $x$ and $y$ was 6.3, $n$ was 4, and $t$ was greater than 1. This block copolymer had an intrinsic viscosity, in toluene at 25° C, of 0.5 dl./g. and a polyphenylene oxide content of 49 weight percent. The material was completely soluble in Pyranol and acted as a surface tension depressant.

EXAMPLE 2

A block copolymer of polyphenylene oxide and polydimethylsiloxane was prepared in accordance with formula I where $a$ was 4, $b$ was 92, the sum of $x$ and $y$ was 6.3, $n$ was 4, and $t$ was greater than 1. The intrinsic viscosity of this material, in toluene at 25° C, was 0.91 dl./g. This material acted as a surface tension depressant for Pyranol, but was marginally soluble in the Pyranol.

EXAMPLE 3

A block copolymer of polyphenylene oxide and polydimethylsiloxane was prepared where the material had the structure of formula I where $a$ was 1, $b$ was 92, the sum of $x$ and $y$ was 6.3, $n$ was 4 and $t$ was greater than 1. This material had an intrinsic viscosity, in toluene at 25° C, of 0.72 dl./g. Though having a lower intrinsic viscosity than the material of example 2, the block copolymer of this example was insoluble in Pyranol and thus could not act as a surface tension depressant. This is contrary to expectation, since at identical polyphenylene oxide block length and nearly identical polyphenylene content, it would be expected that solubility would be based upon the intrinsic viscosity. Thus, in combination with the marginal solubility of the block copolymer of example 2, this example establishes the criticality of length of the polydimethylsiloxane segments.

EXAMPLE 4

To further demonstrate the criticality of the particu- where Me is methyl and $\phi$ is phenyl, was prepared. The material had an intrinsic viscosity, in methylene chloride at 25° C, of 0.67 dl./g. and a polyphenylene oxide content of 88 weight percent. Based upon the intrinsic viscosity, the organic character of the polymer, and the great separation of the polyphenylene oxide segments, it would be predicted that this material would act as a surface tension depressant. However, the material was insoluble in Pyranol, thus establishing the criticality of the polyphenylene oxide block length.

Pyranol is a trademark for dielectric materials, principally of the askarel type. The askarel type of dielectrics are synthetic, non-flammable, electrical insulating materials which evolve only non-explosive gases or gaseous mixtures on decomposition by an electric arc. Particular examples of such materials are chlorinated aromatic derivatives, particularly pentachlorodiphenyl and trichlorobenzene. Smaller amounts of pentachlorodiphenyl oxide, pentachlorophenylbenzoate, hexachlorodiphenylmethane, pentachlorodiphenylketone, and pentachloroethylbenzene may also be included.

In accordance with the present invention, the utility of particular polyphenylene oxide-polydimethylsiloxane block copolymers as surface tension depressants for askarel type dielectric fluids has been demonstrated. The specific examples shown should not be considered as limiting the scope and coverage of the present invention, as more particularly described in the appended claims.

We claim:

1. A surface tension depressant for chlorinated aromatic dielectric fluids having the formula:

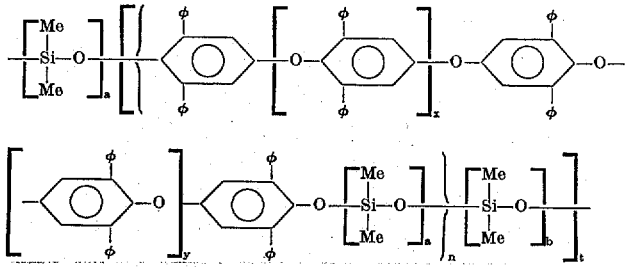

where $a$ is from 4 to 7, $b$ is from 0 to 500, the sum of $x$ and $y$ is from 2 to 17, $n$ is from 1 to 4, and $t$ is 1 or more.

2. The surface tension depressant of claim 1 wherein $n$ is from 2 to 4.

3. The surface tension depressant of claim 1 wherein $b$ is from 0 to 200.